(12) United States Patent
Finkowski et al.

(10) Patent No.: US 6,838,105 B2
(45) Date of Patent: Jan. 4, 2005

(54) DOUGH PRODUCT ROLLING APPARATUS AND METHOD FOR ROLLING DOUGH PRODUCTS

(75) Inventors: James W. Finkowski, Andover, MN (US); Robert F. Meyer, Maple Grove, MN (US)

(73) Assignee: The Pillsbury Company, Minneapolis, MN (US)

( * ) Notice: Subject to any disclaimer, the term of this patent is extended or adjusted under 35 U.S.C. 154(b) by 361 days.

(21) Appl. No.: 10/027,276

(22) Filed: Dec. 21, 2001

(65) Prior Publication Data

US 2003/0118684 A1 Jun. 26, 2003

(51) Int. Cl.$^7$ ............................. A21C 11/00; A21D 8/02
(52) U.S. Cl. ..................... 426/496; 99/353; 99/450.2; 425/320; 425/391; 426/501; 426/512
(58) Field of Search ................... 426/496, 500, 426/501, 502, 512; 99/353, 450.1, 450.2; 425/320, 363, 391

(56) References Cited

U.S. PATENT DOCUMENTS

| | | |
|---|---|---|
| 1,582,382 A | 4/1926 | Collis |
| 3,121,406 A | 2/1964 | Kieffaber |
| 3,458,970 A | 8/1969 | Reid et al. |
| 5,609,094 A * | 3/1997 | Ueno et al. ............... 99/450.2 |
| 5,664,485 A | 9/1997 | McDilda et al. |
| 5,814,360 A | 9/1998 | McDilda et al. |

FOREIGN PATENT DOCUMENTS

| | | |
|---|---|---|
| EP | 0 207 903 | 1/1987 |
| EP | 0 230 335 | 7/1987 |
| EP | 0 746 981 | 12/1996 |
| FR | 1.110.420 | 2/1956 |
| GB | 183848 | 7/1923 |
| GB | 595504 | 12/1947 |
| GB | 2075906 | 11/1981 |
| WO | WO 86/02808 | 5/1986 |
| WO | WO 01/41574 | 6/2001 |

OTHER PUBLICATIONS

European Search Report, EP 02 02 6484 (3 pages).

* cited by examiner

*Primary Examiner*—George C. Yeung
(74) *Attorney, Agent, or Firm*—Mark W. Binder; Arlene L. Hornilla

(57) ABSTRACT

The leading edge of a sheet of dough product impacts an impacting feature and causes the leading edge to roll over onto itself thereby initiating a roll. Engagement enhancement is utilized to increased to increase the ability of the sheet of dough product to resist sliding upon impacting the impacting feature. This provides a tighter rolled dough product having a consistent size and shape. Thus, in accordance with one specific aspect of the present invention, rolled dough products for subsequent packaging into containers may be formed that have a repeatable size and shape. By providing rolled dough products having a repeatable size and shape a more efficient and economical process results. This is because the size and shape of the rolled dough product is controlled with respect to the size of the container.

46 Claims, 12 Drawing Sheets

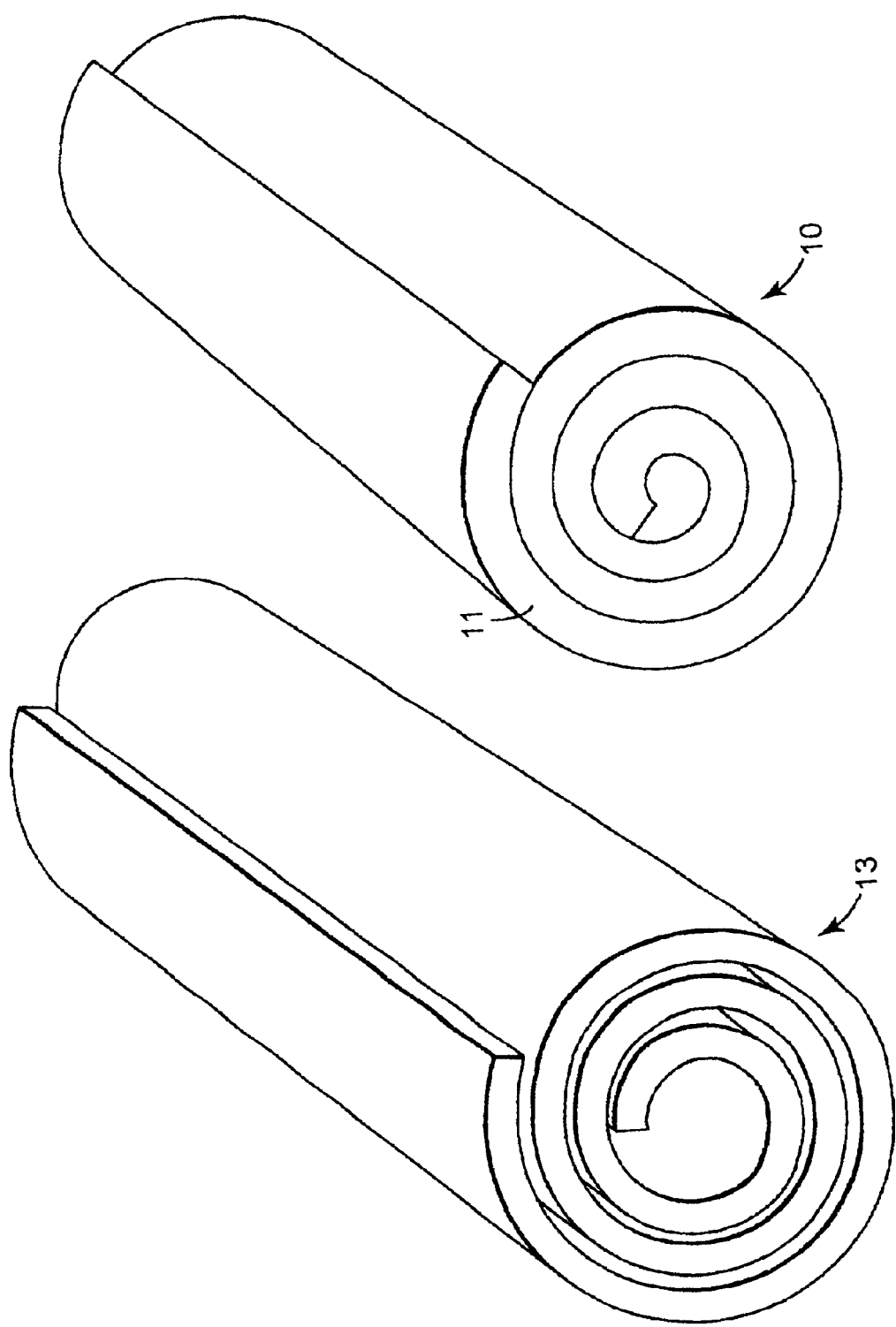

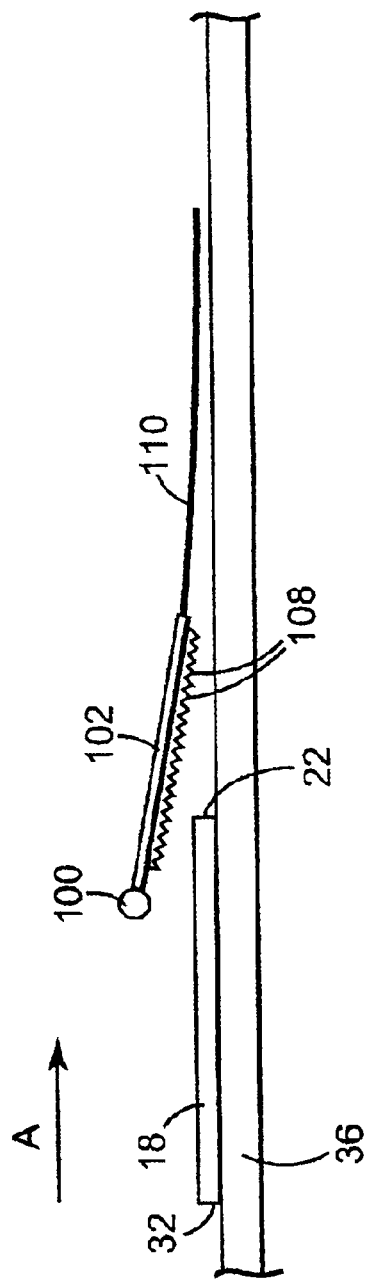
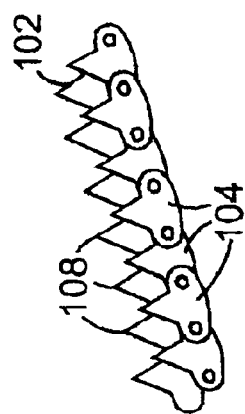

DOUGH PRODUCT ROLLING APPARATUS AND METHOD FOR ROLLING DOUGH PRODUCTS

TECHNICAL FIELD

The present invention relates to equipment that is suitable for processing food products, such as for rolling dough products, and methods of rolling such food products. In particular, the present invention is directed to such a rolling apparatus and method of rolling where engagement enhancement is utilized for improving the ability of a dough product to resist sliding when the rolling is initiated.

BACKGROUND OF THE INVENTION

Many types of food products are rolled. Specifically, food products that include dough are sometimes rolled for a variety of reasons. Dough products may be rolled to form the product itself, e.g., a cinnamon roll. Also, dough products may be rolled to provide a compact and easy to store form. For example, certain types of dough products are rolled and packaged in cans to be later removed and unrolled for use by a consumer. Such would also be the case for a large sheet of dough that may be temporarily rolled for storage. Rolling, as used throughout this Application, means that an edge feature of a dough product is lifted and at least folded over onto itself. As such, the present invention is applicable to dough products having many roll layers and to dough products that are folded over. Rolled dough products include those including dough alone or combined with any number of additional fillings, layers, and the like that may be refrigerated, frozen, or cooked (by baking, frying, and the like) after rolling.

Current trends in food product manufacturing demand high volume and high product yields. Lost product due to poorly controlled manufacturing conditions results in increased costs to the manufacturer and ultimately the consumer. Thus, tight control over manufacturing tolerances is of great importance in order to achieve a consistent, economical, and efficient manufacturing process.

In order to provide a rolled dough product manufacturing process meeting the above requirements, control over characteristics of the rolled dough product is desirable. These characteristics include at least size, shape, and tightness of the rolled dough product. Further, repeatable control of the position of the rolled dough product with respect to subsequent processing equipment is desirable. For example, where a rolled dough product is to be packaged in a can, roll tightness affects the dough product size as it is to be fit within the package volume.

A rolled dough product having a size larger than its intended package would usually be scrapped. Also, a rolled dough product having an exaggerated and inconsistent shape could also end up as scrap due to poor appearance and potential for unacceptability with the consumer. Poor repeatability in positioning a rolled dough product with respect to other processing equipment could result in excess scrap and could lead to a slower manufacturing process. Further, tightness of a rolled dough product, for a specific dough sheet size, will affect the size of the roll. In general, for the same dough sheet size, a tighter roll will be smaller. Ultimately, all of the characteristics of a rolled dough product are interrelated. Thus, control over all of these characteristics generally results in a consistent, economical, and efficient manufacturing process The present invention was developed in particular for refrigerated dough products that are rolled and packaged in cans. Dough product, as used throughout this Application, means any food product that utilizes any formulation of a dough at least in part in making up the food product. The dough that is typically used to make such dough products generally includes flour, water, and a leavening agent, which leavening agent may comprise a chemical leavening system or use an active yeast culture. However, such dough may instead be unleavened for some dough products. The dough may also include other optional ingredients, for example, sweeteners, flavorings, and fat products. The dough products can be coated with a variety of toppings, for example oil, water, or filling, and such toppings may be substantially and uniformly incorporated into the completed rolled dough product. Further, the dough products may also be filled dough products including savory or sweet fillings and the like. Examples of such dough products include cinnamon rolls and the like.

One apparatus for rolling dough is disclosed in U.S. Pat. No. 3,458,970 to Reid et al., which is commonly assigned to the assignee of the present invention and the disclosure of which is entirely incorporated herein by reference. Disclosed in the Reid patent is an apparatus for rolling and packing dough into cans. A strip of dough is fed to a conveyor and cut into rectangular shapes. The cut dough then passes under a sheet of flexible material, such as a canvas sheet, that hangs from a stationary bar. The leading edge of the sheet of dough impacts the hanging sheet of canvas that causes the leading edge to roll over onto itself thereby initiating the roll. The roll is completed as the conveyor surface, frictionally engaged to the sheet of dough surface, moves the dough sheet under the resistance provided by the canvas sheet.

Other known manufacturing equipment for rolling dough include the use of a conveyor with other leading edge impacting mechanisms such as chains or boards that initiate and complete the rolling process. Much like the invention of Reid et al., a conveyor is used to transport a sheet of dough. The leading edge of the moving dough impacts the mechanism thereby causing the leading edge to roll over on itself and initiate the roll. As the conveyor moves the sheet of dough, which is frictionally engaged to the conveyor surface, beneath the stationary chain or board, the roll is completed. Also, a combination of devices may be used together, where one mechanism provides the initial roll and another mechanism completes and tightens the roll as it is conveyed forward.

A problem of the above-described equipment and process for rolling dough is that the impacting force can cause sliding of the dough surface with respect to the moving conveyor surface when the dough impacts the roll-initiating feature, e.g., the hanging canvas sheet, chain mesh, or boards. It has been discovered that this sliding can result in loose and poorly formed rolls that are not acceptable for any number of reasons and that do not properly fit into a can of predetermined size. Furthermore, the resulting manufacturing process is inefficient.

SUMMARY OF THE PRESENT INVENTION

The present invention is based in part on the discovery of the above-described dough product sliding phenomenon and the recognition of the deficiencies in the prior art. Moreover, the present invention overcomes the deficiencies and shortcomings of the prior art by providing an apparatus and technique to enhance engagement between a conveyor surface and a sheet of dough product. Such enhanced engagement increases the ability of the dough product to resist sliding when initiation of the rolling takes place. As a result, a rolled dough product having consistent size, shape, tightness and repeatable position with respect to subsequent processing equipment can be formed. Furthermore, a more efficient manufacturing process results.

In one embodiment of the present invention, such advantages are achieved by using an apparatus having a conveyor supported by a frame structure. The conveyor has a movable surface. The conveyor carries a sheet of dough product through an engagement enhancement station and an impacting station. The impacting station has an impacting feature that impacts the leading feature of the sheet of dough product and initiates a rolling action by causing the leading feature to roll over onto itself. Preferably, the engagement enhancement station uses differential pressure that urges the sheet of dough product against the movable surface thereby increasing its ability to resist sliding upon impacting the impacting feature.

BRIEF DESCRIPTION OF THE DRAWINGS

FIG. 1 is a perspective view of a tightly rolled sheet of dough product formed in accordance with the present invention;

FIG. 2 is a perspective view of a loosely rolled sheet of dough product;

FIG. 13 is a partial side view of the dough rolling apparatus of FIG. 12;

FIG. 14 is a perspective view of a portion of a sticker chain of the dough rolling apparatus of FIG. 12;

DETAILED DESCRIPTION OF THE PREFERRED EMBODIMENTS

Figure 3:
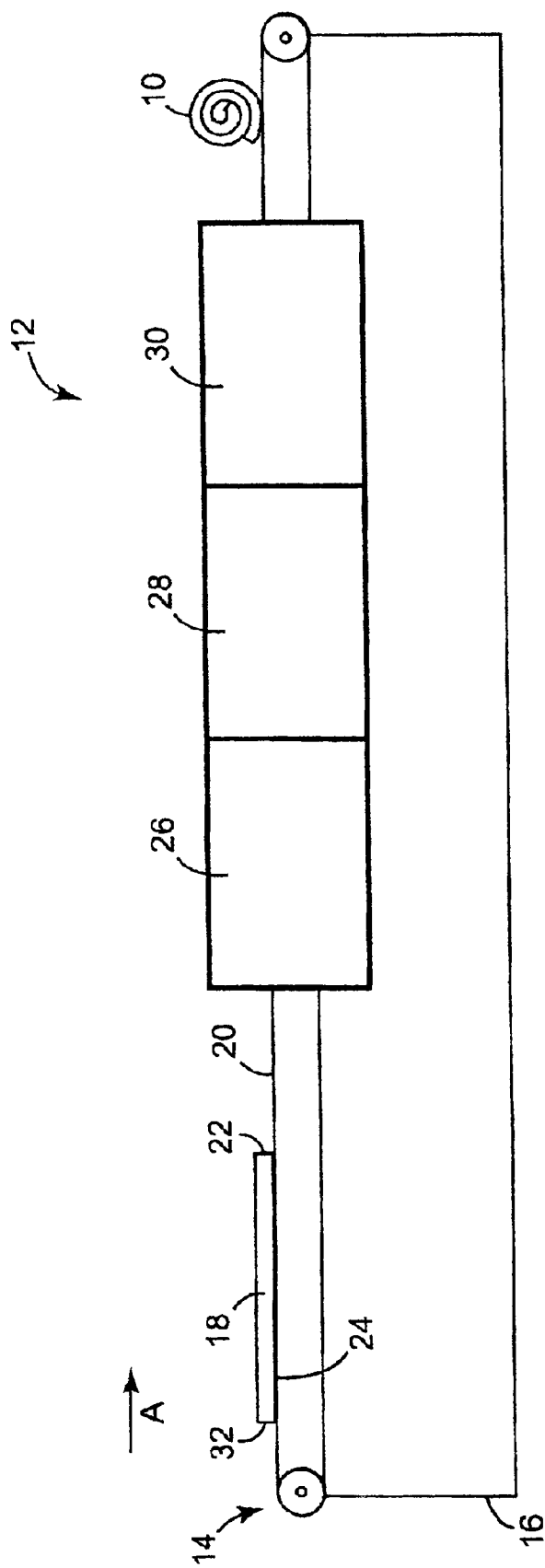
FIG. 3 is a schematic side view of a dough product rolling apparatus showing, in particular, a conveyor for moving dough product through schematic segments of a dough product rolling apparatus and showing an unrolled sheet of dough product entering the apparatus and a rolled sheet of dough product exiting the apparatus.

The present invention is directed to apparatus and methods for rolling food products, in particular rolling dough products. In accordance with the present invention, the apparatus utilizes an engagement enhancement system for increasing the ability of a sheet of dough product to resist sliding. Preferably, the engagement enhancement mechanism includes the use of differential pressure. Differential pressure may be created by any means capable of urging the sheet of dough product against a driving surface so as to increase the frictional force between the dough surface and a driving surface. Preferably, the engagement enhancement system is part of a system for making rolled dough products where throughput and quality requirements can be met with high realization.

In particular, the present invention is directed to apparatus and methods for rolling dough products where the rolled dough product is tightly rolled and has a substantially repeatable size and shape. As set out in the Background section of the present Application, techniques have been developed for rolling dough; however, the present invention is directed to a technique of rolling dough products where the dough product's ability to resist sliding is increased. Specifically, the dough product's ability to resist sliding when the initiation of the rolling process takes place is increased. Such increased resistance to sliding leads to tight, repeatably sized rolled dough products.

Although the present invention is applicable to any food product where it is desired to roll the food product, the present invention is specifically applicable to rolling dough products wherein such dough products are in sheet form. These dough products may optionally comprise toppings and/or fillings or be mixed or otherwise combined with other ingredients. Dough that is typically used to make such dough products generally includes flour, water, and a leavening agent, including known and developed chemical leavening systems and/or an active yeast culture. Unleavened dough may also be used in dough products to which the present invention is applicable. The dough may also include other optional ingredients, for example, sweeteners, flavorings, and fat products and the like or may include additional flavorings and items in piece form, such as nuts, chips, fruits, grains, and the like. Fillings may include savory or sweet ingredients, as examples, and may be rolled within the dough between layers or deposited within a pocket thereof. Toppings or additional ingredients may be added after or before rolling.

A specific example of a rolled dough product to which the present invention is applicable is illustrated in FIG. 1. The rolled dough product 10 comprises a layer of dough 11 that is completely rolled and that may be configured for subsequent packaging, cooking (baking, frying or otherwise), freezing, or other processing. Also, any number of preparatory steps are contemplated in making the dough product 10 in its rolled state.

As shown, the rolled dough product 10 is preferably uniform in size and substantially tightly rolled. Uniform size and shape are important for rolled dough products that are subsequently packaged into a container. For example, conventional dough cans typically hold about 8–16 oz. of dough. Such dough products may be stacked within the can volume. Such dough products are commonly refrigerated uncooked dough products for home preparation after opening the can. Generally, such a rolled dough product 10 is formed from a sheet of dough product 11. The sheet of dough product 11 can be of a shape and of a size and thickness facilitating such use. For example, the sheet of dough product can have a generally square or rectangular shape, a circular shape, a three-sided triangular shape or any other shape desired.

A specific example of a rolled dough product having features that are generally undesirable is illustrated in FIG. 2. Rolled dough product 13 is generally more loosely rolled and has a somewhat larger diameter than is desired. In the case of a rolled dough product to be subsequently packaged into a container, poorly shaped and oversize rolled dough products are undesirable because they do not easily fit into a container having a predetermined size. Thus, scrap product may be generated and a generally inefficient process results.

With reference to the figures of the subject Application, wherein like elements are labeled with like numerals throughout the several figures, apparatus and methods for forming a rolled dough product, such as the rolled dough product 10, are hereinafter described. The rolled dough product 10 is but one specific food product to which the present invention is applicable, and it is understood that any food product which may benefit from rolling, as defined in the Background section of this Application, may be rolled in accordance with the apparatus and methods of the present invention. For explanation purposes, the following description of the apparatus and methods in accordance with the present invention are described as particularly applicable to the rolled dough product 10 of FIG. 1 as being formed from a generally rectangular sheet of dough product.

In FIG. 3, a dough product rolling system 12 is illustrated schematically. The dough product rolling system 12 is preferably a multi-station processing system functionally having an engagement enhancement station 26, an impacting station 28, and a rolling station 30. That is, it is preferable that the system 12 in accordance with the present invention perform these functions regardless of the specific mechanism(s) involved and the timing of such functions. In accordance with the present invention, the enhancement of engagement should occur at least when a dough impact occurs, which action should be followed by at least an initial roll or fold back of the dough product. Further, the dough product rolling system 12 preferably has a conveyor 14, operatively supported on a frame support structure 16 that is schematically illustrated, the conveyor 14 having a movable surface 20 for carrying a sheet of dough product 18 through the dough product rolling system 12 in a processing direction indicated by arrow A.

It is understood that the movable surface 20 of the conveyor 14 may be made of any suitable conventional or future-developed material preferably meeting the requirements of the food industry and having functional features in accordance with the present invention. Examples of such known suitable belts are available from Habasit Belting, Inc. of Suwanee, Ga.

Regarding the conveyor 14, it is understood that it may comprise any conventional or future-developed mechanism for transporting the sheet of dough product through the dough product rolling system 12 in the process direction A. The conveyor 14, in a preferred embodiment, is operatively supported on the frame support structure 16, which frame support structure 16 may generally be fabricated from stainless steel, or structural steel or aluminum; however, any structural material capable of supporting and positioning the conveyor 14 may be used.

The sheet of dough product 18 may be initially provided to the movable surface 20 of the conveyor 14 by any means either conventional or future-developed in accordance with the functional aspects of the present invention. For example, the sheet of dough product 18 may be placed onto the movable surface 20 by a human operator or by a robot or by another machine or conveyor. The sheet of dough product 18 may be provided as a continuous sheet and cut by an additional processing station of the dough product rolling system 12 prior to rolling, or individual sheets can be placed onto the surface 20 at spaced intervals to permit the rolling function described in greater detail below.

The engagement enhancement station 26, the impacting station 28, and the rolling station 30 may comprise separate and individual stations or they may be provided in any combination thereof. That is, the engagement enhancement station 26, the impacting station 28, and the rolling station 30, may be provided as one integrated station performing their individual functions in accordance with the present invention or they may be individual stations separate and distinct from each other. In a preferred embodiment, the engagement enhancement station 26, the impacting station 28, and the rolling station 30, are individual stations and are arranged along the process direction A in the above given order. That is, as illustrated in FIG. 2, the engagement enhancement station 26 is the first station located along the process direction A and the rolling station 30 is the last station located along the process direction A.

As illustrated in FIG. 3, the sheet of dough product 18 has a leading feature 22 and a trailing feature 32. In the case of the dough product 18 as a sheet, the leading feature 22 is the front leading edge and the trailing feature 32 is the back trailing edge of the dough sheet. The sheet of dough product 18 is preferably not wider than the movable surface 20 and has a predetermined length. The leading and trailing features 22 and 32, respectively, may be relatively straight in extending transverse to the machine direction A, or may be otherwise curved, slanted or comprise multiple combinations of such portions in any way. Also, the edges may themselves be rounded, sloped or otherwise. In any case, the leading feature 22 should be provided such that a surface thereof can be impacted, as described below, for initiating a dough rolling function. Furthermore, it is contemplated that the dough product 18 may include other features provided as the leading feature 22 rather than the leading edge. The dough product may, for example, include a feature that extends higher (as viewed in FIG. 3) above the general top surface of the sheet of dough. It is also contemplated that the leading feature 22 may not be the foremost leading portion of the dough product 18. However, the leading feature 22 should be close enough or proximal to the foremost portion so that a roll can be initiated by impact, as described below, which depends on the location thereof and the impacting device, described below.

The conveyor 14 moves the dough product 18 and its leading feature 22 along the dough product rolling system 12, including the engagement enhancement station 26, the impacting station 28, and the rolling station 30, in the process direction A. Also, the sheet of dough product 18 has a dough product surface 24, which is supported by the movable surface 20 such that the sheet of dough product is carried by the movable surface 20 of the conveyor 14. Preferably, surface 24 comprises a surface of at least a dough portion of the dough product 18.

Figure 4:
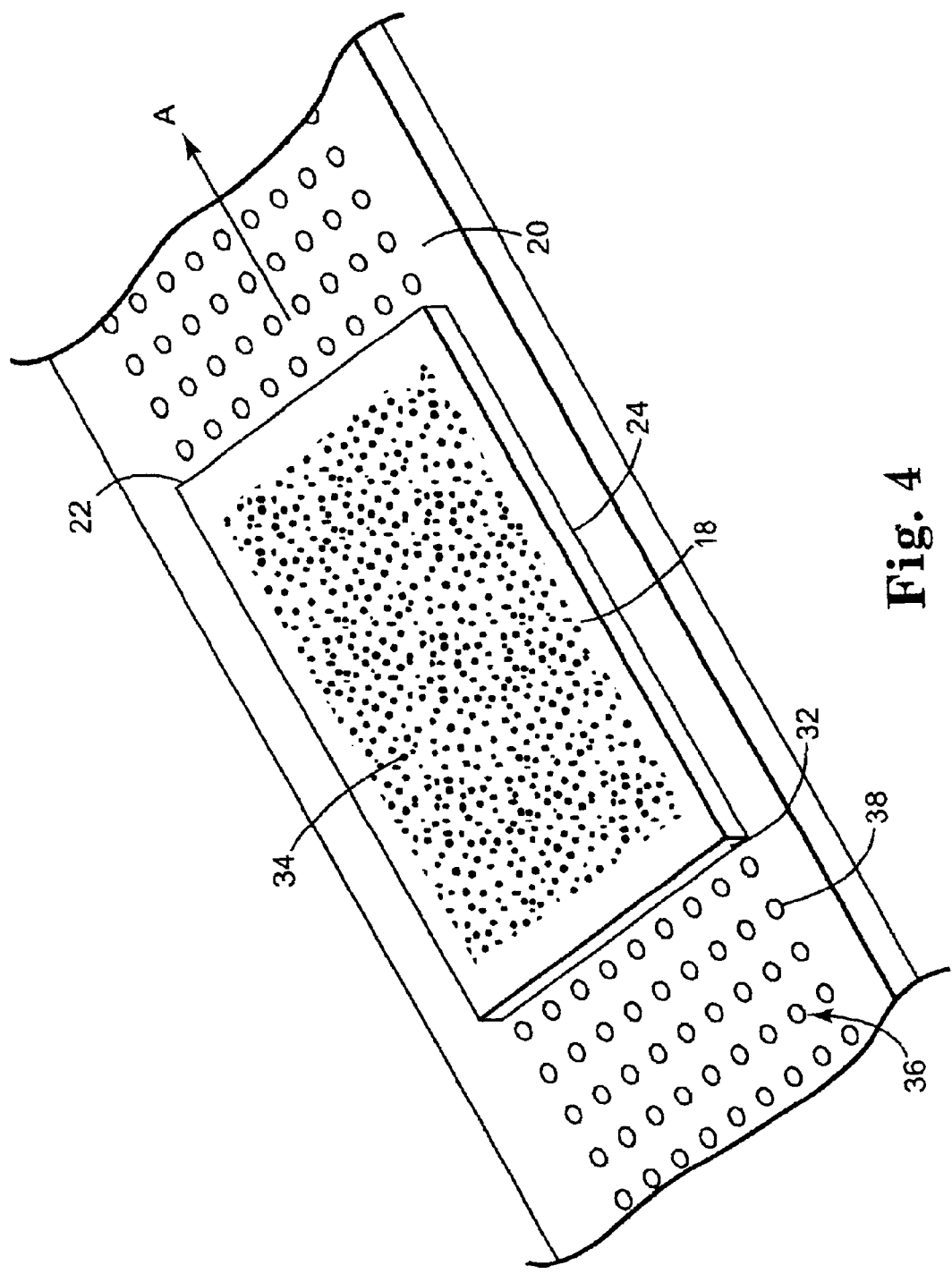
FIG. 4 is a partial perspective view showing a sheet of dough product positioned on a perforated movable surface that is part of the apparatus of FIG. 3.

In addition to providing operative support to the dough product 18, the moveable surface 20, preferably a perforated movable surface 36 as shown in FIG. 4, provides driving engagement with the dough product 18 at least sufficient to drive the dough product 18 with movable surface 20 as it is moved in the machine direction A. The driving engagement is based at least in part on the frictional characteristics of the dough surface 24 and the movable surface 20. Any number of additional functional enhancing features may be added, such as the perforations 38 themselves so as to better drive the dough product 18 as the perforated surface 36 is driven. Moreover, such frictional drive can be enhanced by selection of a different external surface material as the movable surface 36, which itself may only be provided across a portion of the transverse direction of the conveyor 14. In any case, the movable surface 20 defines the driving engagement with the dough product surface 24 during normal conveyance thereof in the machine direction A.

The moveable surface 20 comprises a surface of the conveyor 14, which may comprise a continuous surface of an end-less belt or may comprise a single element or a series of elements arranged to move in the machine direction A. Preferably, an endless belt type conveyor is used having an external layer that defines the functional characteristics of the surface 20 in surface features and material coefficient of friction. More preferably, the movable surface 20 is a perforated movable surface 36. A suitable perforated surface 36 can be provided as a continuous belt as conventionally known having 3/16 inch perforations arranged in a regular pattern on 3/4 inch centers, as commercially available from Habasit Belting, Inc. of Suwanee, Ga. In accordance with a preferred embodiment and as illustrated in FIG. 3, perforations 38 pass completely through the movable surface 20. It is understood that the perforations 38 may be of any shape, size, and spacing and pattern so that fluid (preferably air) communication can be provided through the movable surface 20 and so that the movable surface 20 is capable of operatively supporting the sheet of dough product 18.

With further reference to FIG. 3, the sheet of dough product 18 is illustrated as being operatively supported on the perforated movable surface 36. The dough product surface 24 of the sheet of dough product 18 is in contact with the perforated movable surface 36. Preferably, the pattern of the perforations 38 is arranged with respect to a specific dough product 18 to be transported so that the dough product 18 covers the perforations 38 in the transverse direction so as to permit communication through the perforated movable surface 36 to the sheet of dough product surface 24. However, the sheet of dough product 18 does not need to overlie all of the perforations 38 in the transverse direction as illustrated in FIG. 3, where conditions are controlled otherwise.

The other side of the dough product 18, for example, may include a filling material 34 that will be rolled up with the dough to make up the dough product 10. Such a filling can be applied by any conventional process prior to rolling.

Figure 5:
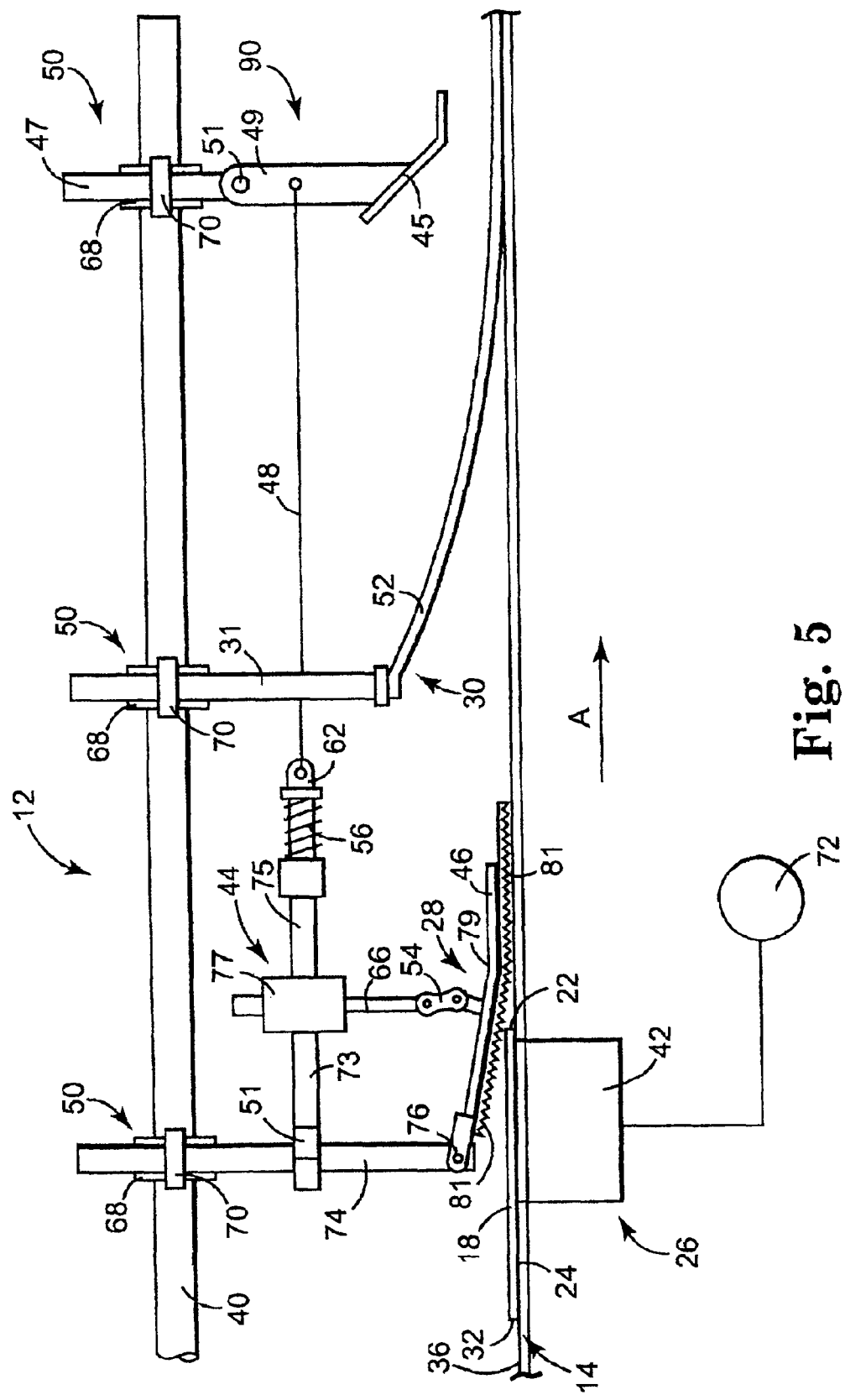
FIG. 5 is a side view of a dough product rolling system comprising a conveyor, an engagement enhancement system, an impacting device having a latching mechanism and a release trigger, and a rolling device, and showing in particular, a sheet of dough product under the action of the engagement enhancement system just prior to its impact with the impacting device.

In FIG. 5, a preferred embodiment of the dough product rolling system 12 is illustrated. The engagement enhancement station 26, impacting station 28, and rolling station 30 are positioned along the process direction A in the above stated order as they would be encountered by the leading feature 22 of the dough product 18. As illustrated, the engagement enhancement station 26 is operatively supported in any conventional manner by the frame 16 (schematically illustrated in FIG. 3) and the impacting station 28, and rolling station 30 are operatively supported by a support structure 40 provided above conveyor 14 that itself may be operatively supported from frame 16 or independently supported by other structure. The support structure 40 may be any such structural supporting means either conventional or developed in accordance with the functional aspects of the present invention.

In a preferred embodiment, the support structure 40 includes a rod or tube that permits sliding clamps 50 to be selectively positioned along its length and readjusted as needed. In the preferred embodiment, the movable clamps 50 include clamps of a split design as are conventionally known and that can be secured in place along support rod 40. Each sliding clamp 50 more preferably includes a first clamp portion 68 that is used for supporting and positioning each sliding clamp 50 along the direction of extension of support rod 40, which, as illustrated, is preferably in a horizontal direction. In the preferred embodiment the horizontal direction and the machine direction A are the same. A second clamp portion 70 is also provided as part of sliding clamps 50, which second portion 70 is used for mounting other components in position in a direction generally perpendicular to the sliding direction of clamp 68. It is contemplated that the first clamp 68 and the second clamp 70 may be at any angle other than perpendicular to one another as long as the functional aspects of the present invention are realized. Preferably, second clamp portion 70 is also of a split design so as to allow quick and easy assembly and positioning of other components. It is to be understood that any movable bracket that allows for support and positioning may be used or that such components may instead be non-adjustably mounted to the support structure 40.

As illustrated in FIG. 5, an engagement enhancement station 26 is positioned as the first station along the process direction A to be encountered by the leading feature 22. In the preferred embodiment, the engagement enhancement station 26 has a chamber 42 for creating suction and that is positioned below the perforated movable surface 36. The chamber 42 is also preferably operatively connected with a vacuum source 72 that may be supported as well by the frame structure 16 or supplied by one or more lines connected to another source. In the preferred embodiment, the chamber 42 is operatively supported in position below the belt of conveyor 14 as it moves in machine direction A. Preferably, the chamber 42 is at least partially open at its top so that the lower surface of conveyor 14 generally closes the top while permitting suction through perforations 38. Alternatively, chamber 42 can be closed by an element provided with openings to permit suction through perforations 38.

Figure 6:
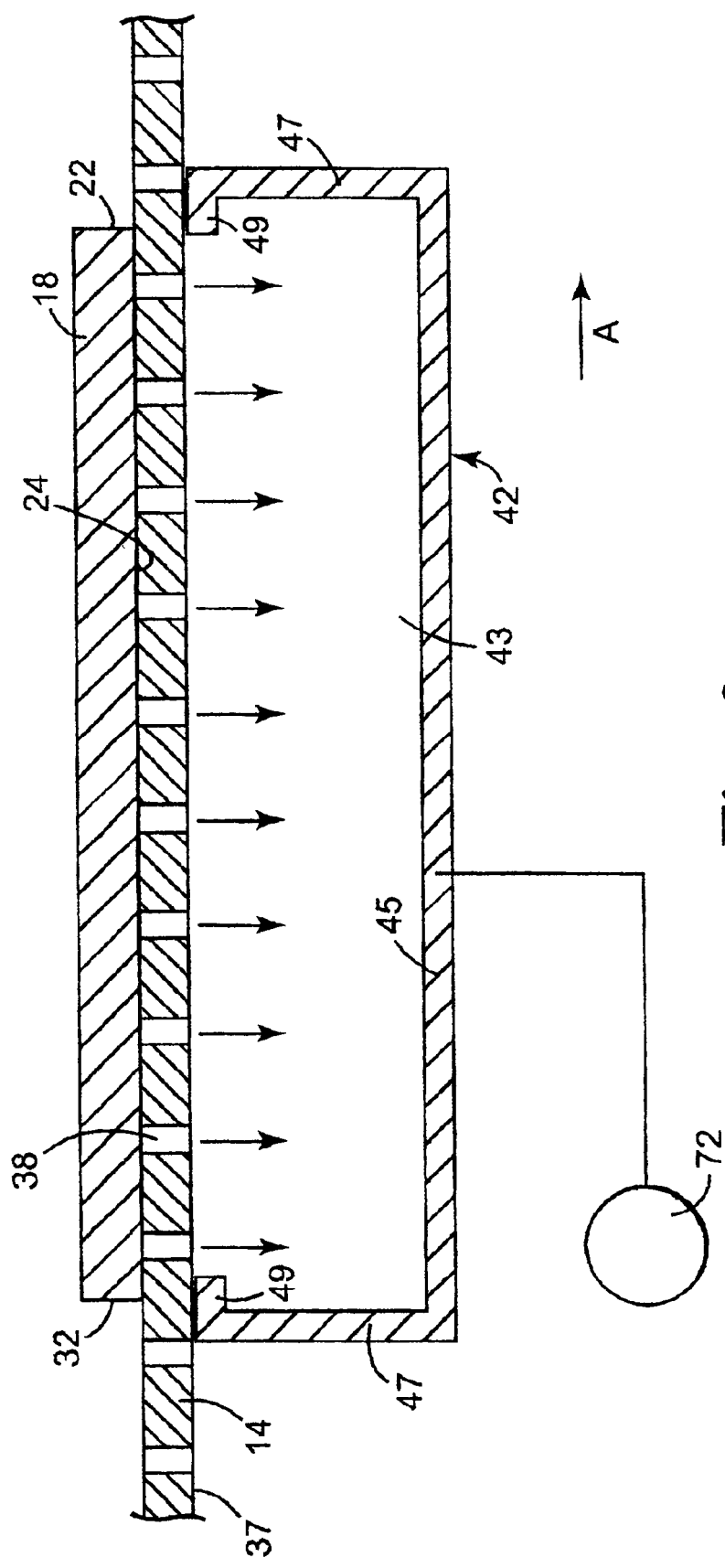
FIG. 6 is a partial cross-sectional side view of the food product rolling apparatus of FIG. 5 showing, in particular, the perforated moveable surface of FIG. 5 and illustrating a vacuum chamber for creating a pressure differential.

FIG. 6 illustrates the vacuum chamber 42 as including an internal volume or plenum 43 within which low pressure is maintained by the vacuum source 72. The vacuum source may be any conventional or developed means for generating vacuum and that is operatively connected to the plenum 43 to create suction through perforations 38 for enhancing the engagement of the surface 24 of dough product 18 with surface 36 of belt 14. The volume of airflow through the perforations 38 that is generated by the vacuum source 72 can be controlled based upon any specific application. For example, where the dough product 18 is of a size such that its surface 24 covers all of the perforations 38 that open to the plenum 43 at some point, preferably at the point of impact described below, the suction may be lower than if one or more perforations 38 were open such that airflow also occurs at the same time. The vacuum chamber 42, as illustrated, comprises a bottom wall 45, sidewalls 47 and upper flange 49 that rides against the lower surface of conveyor belt 14. By providing low pressure within plenum 43, suction also tends to hold the lower surface 37 of belt 14 against flange 49 to enhance suction through perforations 38. It is understood that the chamber 42 can be provided with any different shape or create volumes of different shapes in accordance with the present invention and depending on any specific application. Moreover, the chamber 42 may include a top wall (not shown) having any number of openings arranged in accordance with any desired pattern over which the conveyor 14 passes and is still permits gas flow through perforations 38 of the belt and into the plenum 43.

In accordance with this preferred embodiment, a differential pressure is created, i.e. the pressure above dough product 18 is greater than the pressure below the dough product 18, which urges the dough product 18 against the perforated mobile surface 36. Such action enhances the engagement of the surface 24 of dough product 18 with the mobile surface 36. As described above, the driving engagement between the mobile surface 36 and the dough product surface 24 is increased, thereby more effectively holding the dough product 18 with conveyor 14 in driving engagement.

Figure 7:
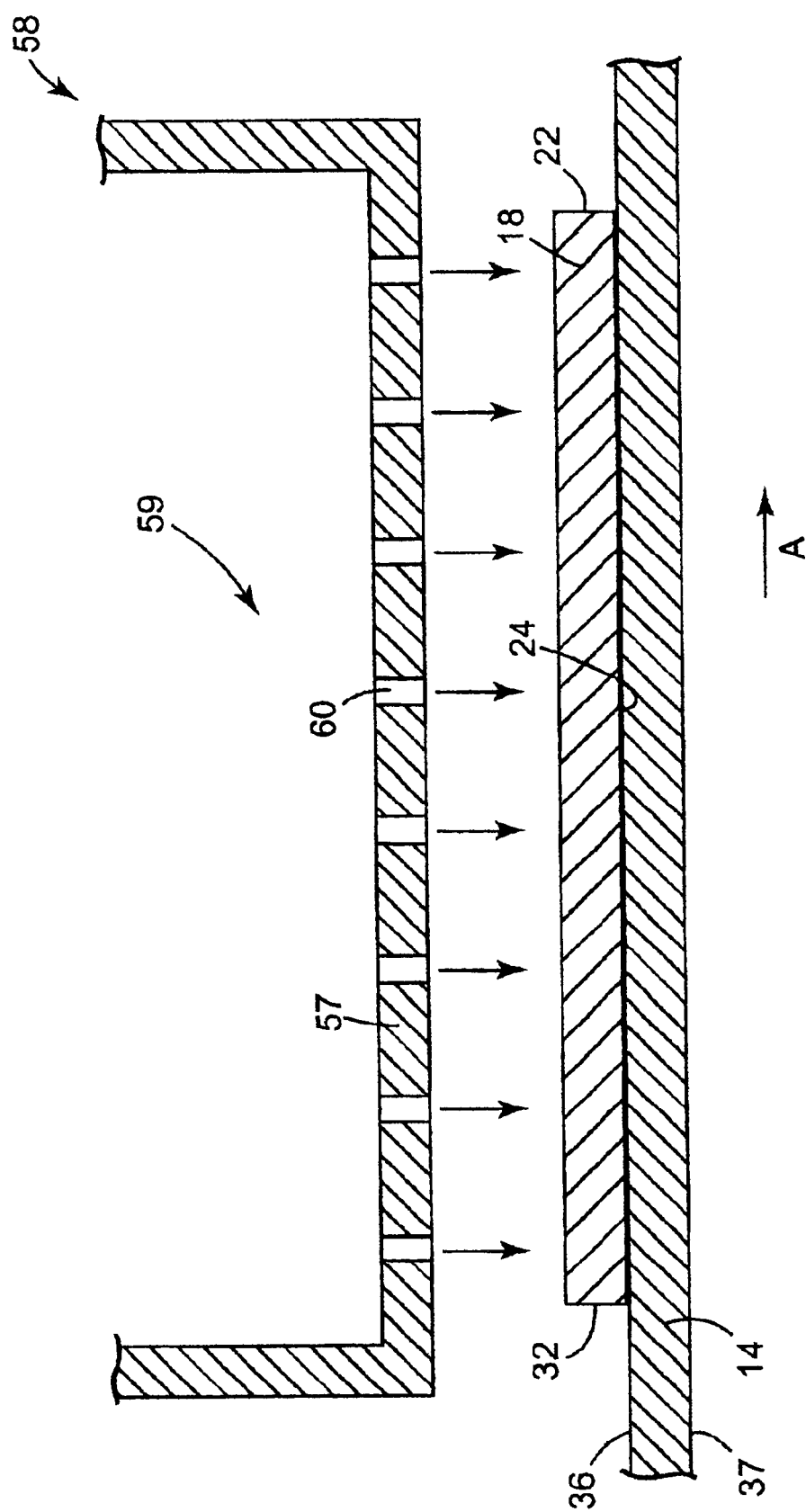
FIG. 7 is a partial cross-sectional side view of an alternate embodiment of the food product rolling apparatus of FIG. 5 showing a forced air system for creating a pressure differential.

Another way of enhancing the drive engagement between the dough product surface 24 and the movable surface 36 that is also based on the creation of a differential pressure is illustrated in FIG. 7. According to this embodiment, forced gas is used to create a differential pressure so that the pressure above the dough product 18 is greater than the pressure below the dough product, which effect is to urge the dough product 18 against the movable surface 36 (that may or may not be perforated). Specifically, a gas supply chamber 58 is illustrated with an internal pressure chamber 59, the chamber 58 including a wall portion 57 with gas supply orifices 60. Any number of gas supply orifices 60 can be provided and arranged as desired for any particular application. Moreover, the design of the chamber 58 may be of any shape, including as a nozzle or a plurality of individual nozzles arranged to create the differential pressure discussed above. Such differential pressure may include impingement of the gas from pressure chamber 59 directly onto a top surface of the dough product 18, or may be provided more generally as a higher pressure zone above the dough product 18. In any case, like the example described above and illustrated in FIG. 6, the driving engagement between the dough product surface 24 and the movable surface 36 is enhanced at this point.

It is also contemplated that other means may be used to enhance this driving engagement between the dough product 18 and the conveyor 14 at a specific location along the machine direction A. Preferably, the enhanced driving engagement is a temporary function that is maintained during at least the impacting function provided by impacting station 28 as described in greater detail below.

As an alternative to creating a differential pressure, the engagement may be enhanced by mechanical means or chemical means. For example, a mechanical mechanism could be provided including one or more elements that are triggered at a point in the machine direction A, which elements, for example, could be maintained within the thickness of conveyor 14 to extend within the dough product 18 at a desired timing. As a chemical means, a fluid having adhesive properties to enhance the driving engagement may be introduced to the interface, such as through perforations 36 at the appropriate time.

Further referring to FIG. 5, an impacting station 28 is illustrated that is connected to the support structure 40 using movable bracket 50 and positioned along the processing direction A and positioned above the perforated movable surface 36. The clamp portion 68 of the movable bracket 50 is connected to the support structure 40. The clamp portion 70 of the movable bracket 50 is connected to a slidable support member 74 that may be conventionally locked in any position along its length. An impacting device 46 is pivotably connected to the support member 74 at pivot point 76. The impacting device 46 is further pivotally connected at an intermediate location thereof to a linkage 54 and the linkage 54 is pivotally connected to a latch shaft 66 of a latching mechanism 44. Sliding member 74 permits the forward edge of the impact device 46 to be adjusted in its vertical position by clamp portion 70. A guide clamp 51 is also vertically located on support member 74 and connects with a horizontal support member 73 that extends in the machine direction A to support the latching mechanism 44 in position. A second support member 75 also extends beyond latching mechanism 44 and is preferably hollow at least beyond the latching mechanism 44 to slidably receive a holding pin 62, as is described in detail below.

The impacting device 46, in accordance with a preferred embodiment of the present invention, is provided for causing at least initial folding over or rolling of the sheet dough product 18 as it is driving in the machine direction A. To do this, the impacting device 46 preferably comprises a semi-rigid board of any machineable material such as plastic or metal, wherein the material includes an intermediate angle at 79 and a series of grooves defining teeth 81 that are provided to impact the leading feature 22 of the dough product 18. The teeth 81 may extend transversely partially or completely across the impacting device 46, which itself may be (but not necessarily) as wide as or greater than the dough product 18. As one or more of the teeth 81 impact the leading feature 22 of the dough product 18 while it is driven forward, a rolling action is initiated. As the roll begins, the impacting device 46 is caused to raise, which action is facilitated by pivot 76 and pivoted link 54. Such action also causes the latch shaft 66 to move upward.

Importantly, in accordance with the present invention, the impact caused by impacting device 46 while the dough product 18 is driven forward occurs while the driving engagement between the dough product 18 and the conveyor 14 is enhanced. In the illustrated embodiment, this is preferably done while the suction from vacuum chamber 42 enhances the driving engagement. By doing so, the dough product 18 is less likely to slide along the conveyor surface 36 and a roll is more effectively initiated. A good roll start also leads to a tighter overall roll of the dough product. A desired degree of enhancement of the driving engagement depends upon the factors of any specific application including the frictional characteristics of the dough product surface 24 and of the movable conveyor surface 36. For example, the dough product surface 24 may comprise ingredients or be treated with an ingredient, such as oil, that makes it more slippery, which situation would likely require a greater driving enhancement than a conventional less slippery dough. In accordance with the present invention, however, the entire conveyor surface 36 or dough product surface 24 need not be altered to increase frictional drive between the two because the driving force can be enhanced temporarily at the point where that is needed, i.e. at the point of impact so as to effectively create consistent dough product rolls.

Other impacting devices 46 are contemplated as known or developed for initiating a dough roll. Such devices can include chain meshes, canvas, boards or other configurations, and other stationary or movable mechanisms that cause a leading feature 22 of any dough product 18 to fold rearward by an impact between the leading feature 22 and such device 46.

Figure 8:
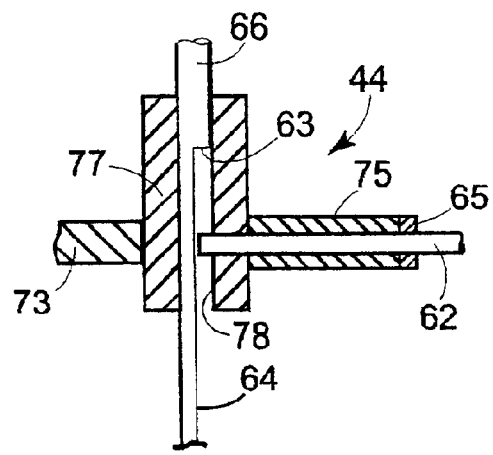
FIG. 8 is a partial cross-sectional side view of a latching mechanism of the dough product rolling system of FIG. 5 showing, in particular, a raised state of the mechanism.
Figure 9:
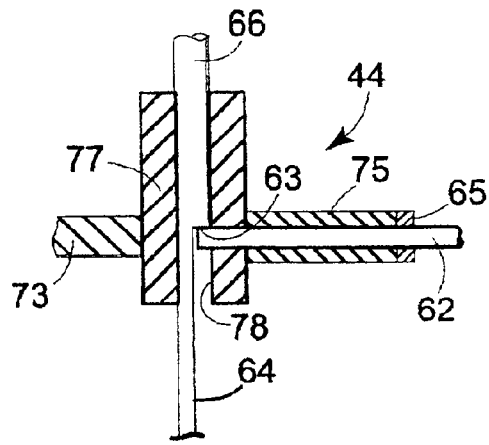
FIG. 9 is a partial cross-sectional side view of the latching mechanism of the dough product rolling system of FIGS. 5 and 8 showing, in particular, a latched state of the mechanism.
Figure 16:
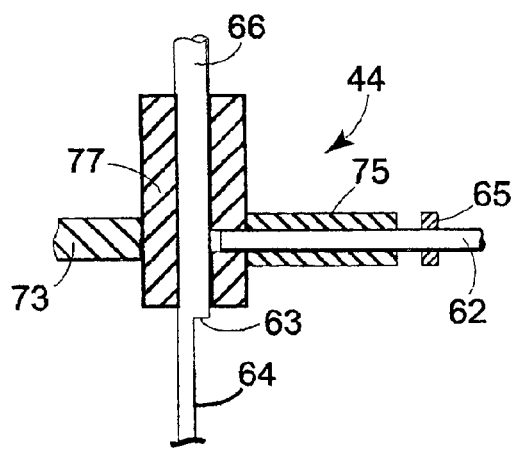
FIG. 16 is a partial cross-sectional side view of the latching mechanism of the dough product rolling system of FIGS. 5 and 8 showing, in particular, an unlatched state of the mechanism.

Cross-sectional views of the latching mechanism 44 in various configurations are illustrated in FIGS. 8–9, and 16. In FIG. 8, the latching mechanism 44 is shown in an up position such as may be any position where an at least partially completed roll is positioned under the impacting device 46 (possibly up to the extent that a roll is created by the impacting device 46). In FIG. 9, the latching mechanism 44 is shown in an intermediate position lowered from the FIG. 8 up position, such as a position to accommodate unrestricted passing of a trailing portion of a partially rolled sheet of dough that after the partially rolled sheet is moved beyond the impacting device 46 still lies beneath the impacting device 46 (i.e. so that the impacting device is not dragged across the trailing dough surface). And, in FIG. 16, the latching mechanism 44 is shown in a down position where the impacting device 46 is ready to impact the leading feature 22 of an incoming sheet of dough product (such as in FIG. 5).

As illustrated, a latch body 77 is connected and supported in position by the support member 73 and preferably includes a vertical guide passage 78 that slidably guides the latch shaft 66. The latch shaft 66 has a cutout surface 64, which preferably defines a stop 63 for holding the latch shaft at an intermediate position as is shown in FIG. 9 and as described below. A tension spring 56 (see FIG. 5) is preferably operatively connected between an end of support member 75 and a flange of the holding pin 62 to provide a biasing force so that the holding pin 62 is normally urged in the direction toward the latch shaft 66. Preferably, even under the biasing force, the latch shaft 66 remains free to move as guided by the guide passage 78, as shown in FIGS. 8 and 16 on either the surface 64 or the external surface of the remaining latch shaft 66, provided the holding pin is located on either side of the stop 63. To facilitate easy sliding on the surface 64, in particular, a hard stop 65 or the like is preferably provided on holding pin 62 to abut the end of support member 75 and thus restrain its movement toward surface 64 (see FIG. 8) under the bias of the spring 56. That is, the latch shaft 66 (and thus the impacting device 46) may easily float up and down when the holding pin 62 is positioned anywhere along the surface 64, which occurs after a dough roll has reached a certain level and that accommodates the rolling of various size dough rolls by the impacting device 46.

Figure 10:
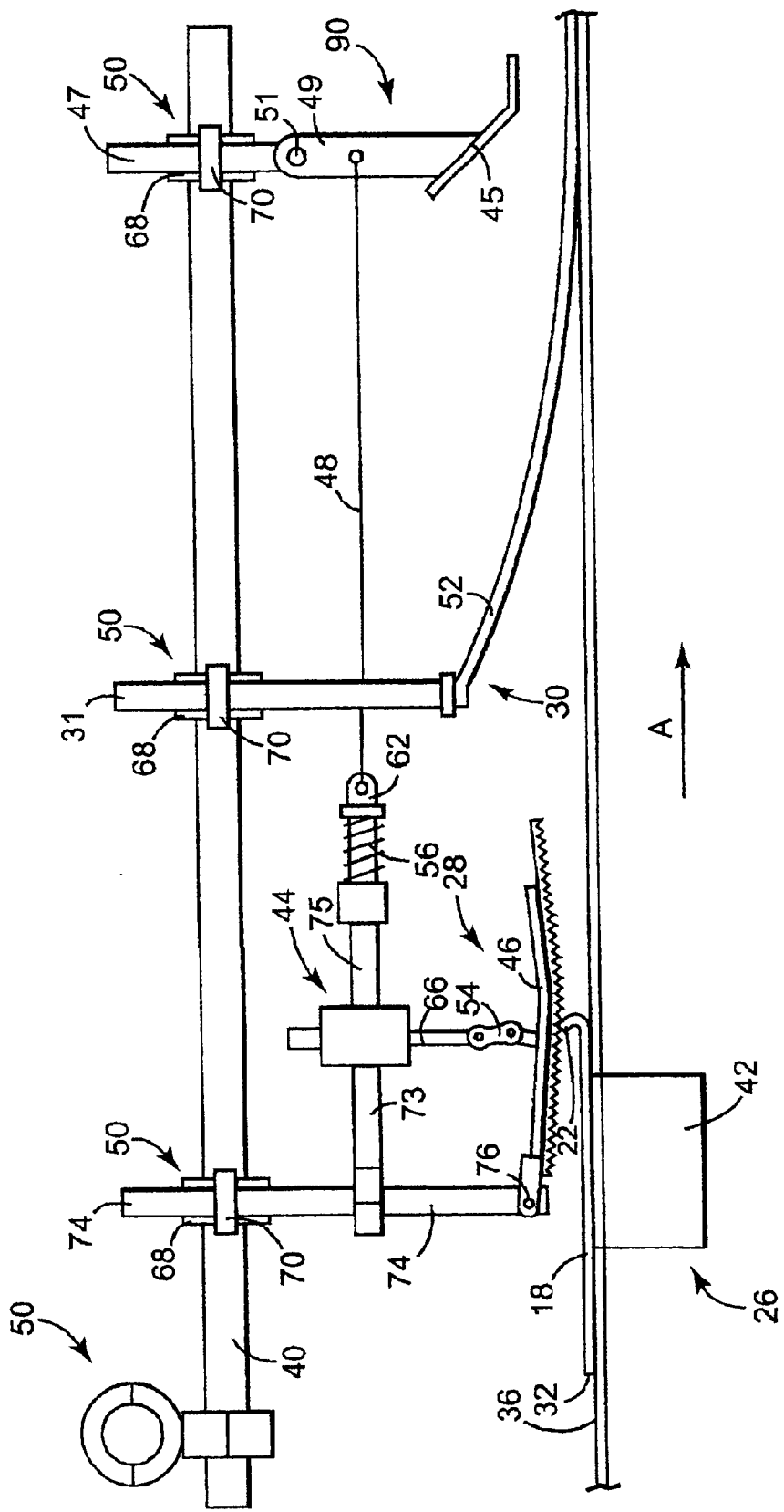
FIG. 10 is a side view of the dough rolling apparatus of FIG. 5 showing, in particular, initiation of the rolling of the sheet of dough product just after impacting the impacting device.

FIG. 16 illustrates the latch shaft 66 in a lowered position where the impacting device 46 is positioned for impacting a leading feature 22 of a dough sheet 18, such as shown in FIG. 5. In this position, the upper external surface of the latch shaft 66 (the portion of latch shaft 66 above stop 63) is positioned adjacent to the end of holding pin 62. In this position, and to the point of stop 63, the end of holding pin 62 rides against the external surface of latch shaft 66 as latch shaft 66 is raised. As shown in FIG. 10, the impacting device 46 begins to raise when a roll begins to form, which action raises the latch shaft 66. When a roll is formed to at least some predetermined degree (which may be minimal just above the thickness of the dough sheet 18) the stop 63 will be moved past the end of the holding pin 62. Once the stop 63 moves just past the end of holding pin 62, the holding pin 62 will move toward surface 64 under the influence of spring 56. As above, this movement is preferably limited by the hard stop 65 so that the remaining movement is substantially unrestricted. Continued raising of the impacting device 46, such as occurs as the roll gets larger under the impacting device 46, causes continued raising of the latch shaft 66 with the end of holding pin 62 position to somewhere along the surface 64 of the latch shaft 66. Such a partially completed dough roll can then move beyond the impacting device 46 while the end of holding pin 62 is positioned at any point along surface 64. As can be seen, this accommodates the partial or completed rolling of dough rolls of various sizes.

Once a partially complete dough roll is created by the impacting device 46 and it is moved to beyond the impacting device 46, a trailing portion of the dough sheet 18 will likely still be positioned below at least the trailing end of the impacting device 46. The impacting device 46 will fall downward under the influence of gravity, which action causes latch shaft 66 to also move downwardly, until the stop 63 of latch shaft 66 engages and upper surface of the end of holding pin 62 to limit the downward travel of the latch shaft 66. So long as the stop 63 is positioned taking into account a maximum dough thickness, the stop 63 will prevent the impacting device 46 from dragging across the trailing portion of the dough sheet 18. In order to permit the latch shaft 66 to move further downward and eventually to its FIG. 16 position, the holding pin 62 is moved against the bias of spring 56 at least until the stop surface 63 can move past the end of holding pin 62. The holding pin 62 may be moved out of the way of stop surface 63 by any manual or automatic mechanism or system, of which a preferred trigger system is described below.

It is contemplated that other latching mechanisms and or devices may be used instead to permit and/or control the movement of the impacting device 46 has a dough roll is formed. Such mechanisms or devices may permit floating movement during all or a portion of travel of the impacting device 46, or they may be specifically limited to forming specific size to rolls. For example, other frictional rod gripping mechanisms as are well-known may be utilized to frictionally hold a latching pin in any position as it is moved upward by the impacting device 46 as a dough roll is formed. Such gripping mechanisms are releasable, as also known, so that the rod could easily be moved downward at a desired time or triggering event. Hydraulic or pneumatic cylinders may also easily control and/or permit movement of the impacting device 46 has desired. It is also contemplated that positive drive devices may instead be used to control such movement.

According to one embodiment, the latching mechanism 44, and in particular the holding pin 62 is further connected to a trigger mechanism 90 for releasing the latch shaft 66 against the bias of spring 56 from the intermediate position shown in FIG. 9 and allowing it to return to the unlatched or down position shown in FIG. 16. In the preferred embodiment, the latch shaft 66, upon being released from the intermediate position shown in FIG. 9 moves to the unlocked or down position shown in FIG. 16 under the influence of gravity. It is contemplated that force in addition to that of gravity may be used. For example, additional force may be added by adding a spring or similar loading mechanism or by the addition of weight or by the use of a drive means. The trigger mechanism 90 is connected to the support structure 40 using movable bracket 50 and positioned along the processing direction A and positioned above the perforated movable surface 36. The clamp portion 68 of the movable bracket 50 is connected to the support structure 40. The clamp portion 70 of the movable bracket 50 is connected to a slidable support member 47. A trigger 49 is pivotably connected to the support member 47 at pivot point 51. The trigger 49 has a deflecting plate 45 connected to the end of the trigger 49. The trigger 49 is connected to the holding pin 62 of the latching mechanism 44 by a cable 48. It is known that any structural link device or mechanism may be used in place of the cable 48.

The latching mechanism 44 and the trigger mechanism 90 function together to hold (latch) the impacting device 46 in a raised position, where the trailing portion of a partially rolled sheet of dough can pass under it, and to return (trigger) the impacting device 46 to a down position for impacting the leading feature of a dough product. The impacting device 46 is illustrated in a down position in FIG. 5 (and FIG. 16). The impacting device 46 is illustrated in a raised or up position in FIG. 11 (the intermediate position of FIG. 9). The raised position of the impacting device 46 generally depends on the thickness of the sheet of dough product to be rolled and the amount of rolling to be performed by the impacting device 46. The position of the support member 74 is adjustable by movable clamp portion 70 to position the initial height of the impacting feature 46.

As above, it is contemplated that any mechanism or device that positions the impacting device 46 in accordance with the functional aspects of the present invention may be used in place of the latching mechanism 44. Likewise, it is equally contemplated that the trigger mechanism 90 can comprise any other mechanism or device having operability with the positioning or latching device. Such triggers may include any combination of electronic, mechanical, hydraulic, pneumatic devices or the like that are operatively connected to provide some aspect of automatic control to the positioning or latching device. It is also contemplated that the triggering mechanism may comprise manual implementation alone or with other mechanisms to control the positioning or latching device.

Referring to FIG. 5, the rolling station 30 is connected to the support structure 40 using movable bracket 50 and positioned along the processing direction A and positioned above the perforated movable surface 36. The clamp portion 68 of the movable bracket 50 is connected to the support structure 40. The clamp portion 70 of the movable bracket 50 is adjustably connected to a support member 31. The support member 31 is connected to a stationary sheet 52. The stationary sheet 52 is preferably a chain mesh that hangs down and extends in the machine direction A. Chain meshes themselves are well known, such as are commercially available from Cambridge Metal Belts company of Cambridge, Md. The stationary sheet 52 may otherwise comprise a canvas or flexible board or other device or mechanism that will create a drag force on the partially rolled dough product 18 created by impacting device 46. The drag force acting on the dough product 18, as it is continued to be driven forward in machine direction A, causes the dough product to be further rolled and tightened based upon the length of the stationary sheet 52 and ultimately to be fully rolled. In accordance with the present invention, the impacting device 46 preferably starts a tight roll with assistance of the enhanced drive force created during the initial impact. Then, a drag force created by the stationary sheet 52 completes a tighter more uniform roll of dough product 18. Using the movable bracket 50, the position of the support member 31 is adjustable along the process direction A with respect to the position of the impacting station 28 and the trigger mechanism 90. Also, the vertical position of the stationary sheet 52 is adjustable using movable bracket 50.

In FIG. 5, the sheet of dough product 18 is illustrated at the engagement enhancement station 26 just prior to impacting the impacting feature 46. The vacuum chamber 42 creates a differential pressure such that the pressure above the sheet of dough product 18 is greater than the pressure below the sheet of dough product 18 thereby urging at least a portion of the sheet of dough product 18 against the perforated movable surface 36 and thereby enhancing the driving engagement of the sheet of dough product 18 to the perforated movable surface 36. This enhanced driving engagement increases the ability of the dough product 18 to resist sliding when the leading feature 22 impacts the impacting device 46.

In FIG. 10, the sheet of dough product 18 is illustrated shortly after the leading feature 22 impacts the impacting device 46. As illustrated, the leading feature 22 of the sheet of dough product 18 initiates a rolling action by being folded over on to itself. As the sheet of dough product 18 moves under the impacting device 46, the impacting device 46 is urged upwards and pivots at pivot point 76. Also, the shaft 66 of the latching mechanism 44 is driven upwards such as is illustrated in FIG. 8. The latching mechanism 44 is configured such that the impacting device 46 may float up and down as dough impacts and passes beneath it. After an initial rolling takes place, the impacting device 46 is preferably latched in an intermediate position so that the trailing feature 32 of the sheet of dough product 18 can pass completely under the impacting device 46. Otherwise, the impacting device 46 could fall onto the trailing portion of the sheet of dough product 18 once the partially formed roll portion thereof passes beyond the impacting device 46. Instead of latching, the impacting device could be otherwise delayed for a specified time period or by damping its movement down or by utilizing drive devices and the like.

Figure 11:
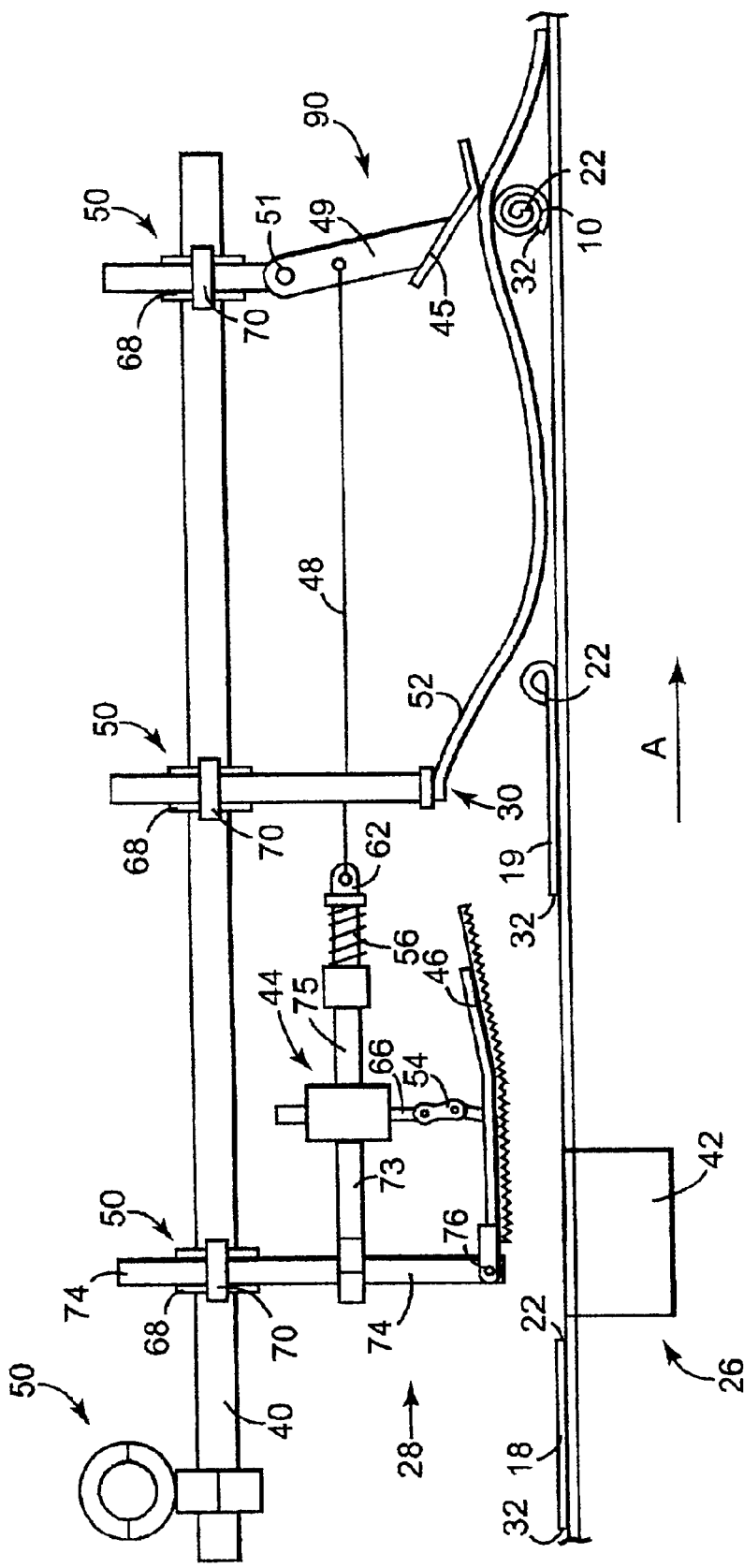
FIG. 11 is a side view of the dough rolling apparatus of FIG. 5 showing, in particular, the impacting device in a latched state after initiating a dough product roll and a completely rolled sheet of dough product in position for triggering a latch release device.

In FIG. 11, the preferred embodiment of the dough product rolling system 12 is illustrated showing an unrolled sheet of dough product 18 entering the system, a partially rolled dough product 19 leaving the impacting station 28 and entering the rolling station 30, and the rolled dough product 10 triggering the latch release of the latching mechanism 44. The impacting device 46 is shown in an intermediate position such as the position illustrated in FIG. 9. This allows the trailing feature 32 of the partially rolled sheet of dough product 19 to pass completely under the impacting device 46. As the partially rolled dough product 19 continues to move in the machine direction A under the driving of the conveyor 14, the drag force of the stationary sheet 52 causes the roll to proceed to a completely and tightly rolled state. Next, the rolled dough product 10 pushes against the deflecting plate 45 causing the trigger 49 to pivot at pivot point 51 thereby pulling the cable 48 to release the impacting device 46 from the intermediate latched position. The impacting device 46 then returns to the unlatched or down position of FIG. 16. The position of the trigger 90 with respect to the impacting station 28 along the process direction is dependent upon the position of the trailing feature 32. That is, the trigger 90 should be positioned to return the impacting device 46 to the down position after the trailing feature 32 has cleared the impacting feature so that the impacting device 46 is ready to start a next roll. It is understood that optimized positions for the engagement enhancement station 26, the impacting station 28 including the trigger mechanism 90, and the rolling station 30 is determined based upon any desired timing sequence and based upon the food product being processed and that the optimized positions for such application may be empirically determined. In accordance with the illustrated embodiment, timing can be easily controlled by adjusting the spacing of each of the functional stations along the support structure 40 in the direction of conveyance A.

Figure 15:
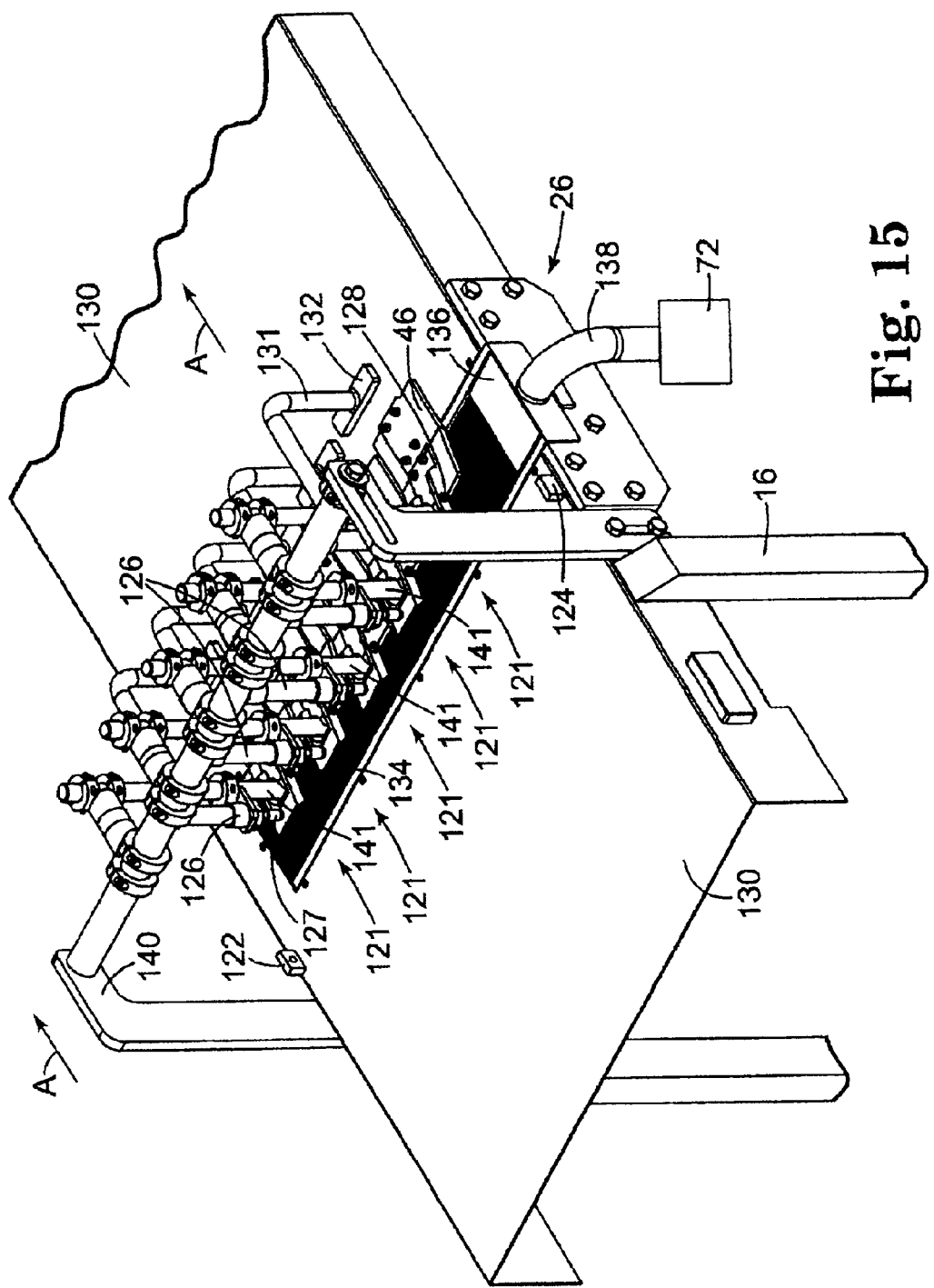
FIG. 15 is a perspective view of a multiple lane dough sheet rolling apparatus with its movable surface conveyor removed to show the engagement enhancement station as extended to cover the multiple lanes.

In FIG. 15 an exemplary multilane processing system 120 is shown. The system has multiple lanes 121 for rolling dough in accordance with the present invention and includes a support structure 140 for supporting components of the system. The system 120 utilizes a sensor arrangement having a first sensor 122 and a second sensor 124 for sensing the position of a sheet of dough (not shown). Any device or sensor that can indicate the presence of a sheet of dough product may be used such as conventional proximity sensors and photo-eye type detectors. Each lane 121 can have a set of such sensors to independently sense a dough product 18, or, where dough products 18 are fed in unison along the plural lanes 121, a single sensor set could suffice. Further, each lane 121 includes an extendable cylinder 126 operatively supported in position by the support structure 140 for controlled pivoting of its associated impacting device 46 about a pivot point 128 as described below. Each impacting device 46 is shown pivotally supported at pivot point 128 that can comprise any conventional pin that is positioned by downward supports 141 of the support structure 140. Each cylinder 126 has a rod 127 that may controllably extend and retract from the cylinder 126 as well known. Preferably the cylinder is a conventional air cylinder that is remotely actuatable. The impacting device 46, as shown, extends in the conveyance direction A to impact a dough product 18 in a manner similar to that described above. In addition, an extension portion 146 extends in the opposite direction from the pivot point 128, which extension portion 146 is positioned adjacent to an end of the rod 127 of a cylinder 126. The extension portion 146 may be operatively connected with the rod 127 so that a cylinder 126 can be used to drive movement of an impacting device 46 in one or both directions or to merely damp motion down. Alternatively, the end of rod 127 may merely limit downward pivotal motion of the impacting device 46 by stopping movement of the extension portion 146 about pivot 128 without connection between the rod 127 and the extension portion 146. By controlling the extension of rod 127, such as to a partial extension, an intermediate position of the impacting device 46 can be easily created so that a trailing portion of a dough sheet can be accommodated below the impacting device 46. That is, the impacting device 46 would be limited in its downward pivotal motion by the impact of its extension portion 146 with the rod 127 at its partial extension. At the same time, however, the impacting device 46 would be unrestricted in its upward pivotal motion, so as to provide a floating effect for accommodating rolls of various sizes. Then, to permit the impacting device 46 to return to its lower impact position, the rod 127 can be simply retracted sufficiently. The impact position may be defined by the position of the rod 127 or another stop mechanism can be used.

It is contemplated that any device may be used to move the impacting device 46 between an up an down position in accordance with the present invention. Also, the system 120 preferably includes a timer (not shown) for controlling the movement of the cylinder 126 as is described below. The timer may be any conventional type and is preferably integrated with a control system (not shown) such as a computer or logic controller or the like for interfacing with the sensors 122 and 124 and for controlling the movement of the cylinder 126 and extendable rod 127.

Further referring to FIG. 15, the system 120 includes a support surface 130 for supporting a conveyor having a movable surface 36 thereon (not shown in this view) and is supported by the frame 16. Also shown are a plurality of support members 131 operatively provided from support structure 140, each for attaching a sheet 52 (not shown here, see FIG. 5) to a plate portion 132 thereof. Each plate 132 can support an independent sheet 52 or they may together support a common sheet 52.

The engagement enhancement station 26 is shown having a mesh 134 covering a common vacuum chamber 136 that is operatively connected to and supported by the frame 16 and the surface 130. The vacuum chamber includes a tube 138 for connection to the vacuum source 72. The engagement enhancement station 26 is positioned with respect to the impacting device 46 so that enhanced engagement occurs as the leading edge of a sheet of dough impacts the impacting device as described above. A plurality of vacuum chambers may instead be provided, such as one for each lane 121 or for any plurality of lanes 121 in combination.

The cylinder 126, sensor 122 and 124, and the timer are preferably used to control the movement and position of the impacting device 46 with respect to the position of a sheet of dough product. Preferably, the timer is capable of timing multiple intervals. Preferably, a sheet of dough product moves in the process direction A and its leading feature is sensed by the sensor 122 and 124. At this point the impacting device is in a down position such as similar to the position shown in FIG. 5. At some predetermined point, the timer preferably starts and the timer sets a predetermined time throughout which the rod 127 remains retracted away from the extension portion 146 of the impacting device 46 so that the impacting device 46 may float up and down freely, as described above. The sheet of dough product thus impacts the impacting device 46 to initiate a roll, which rolling action causes the impacting device 46 to pivot upward freely. Preferably after a predetermined time (indicative of the creation of a partial roll), the timer expires and triggers the rod 127 to extend by a predetermined distance thereby setting a stop that is similar in function to the stop 63 described above. This stop holds the impacting device 46 at a partially up position so the trailing end of the partially rolled sheet of dough product may pass under the impacting device 46. Preferably, the rod 127 is extended in this position for a predetermined time, which may be controlled by the timer or a separate timer or control system. After such predetermined time expires, the rod 127 retracts and the impacting 46 returns to the down position for impaction an incoming sheet of dough product. The entire process can thus repeat each time that a sheet of dough product is sensed by the sensor 122 and 124.

Figure 12:
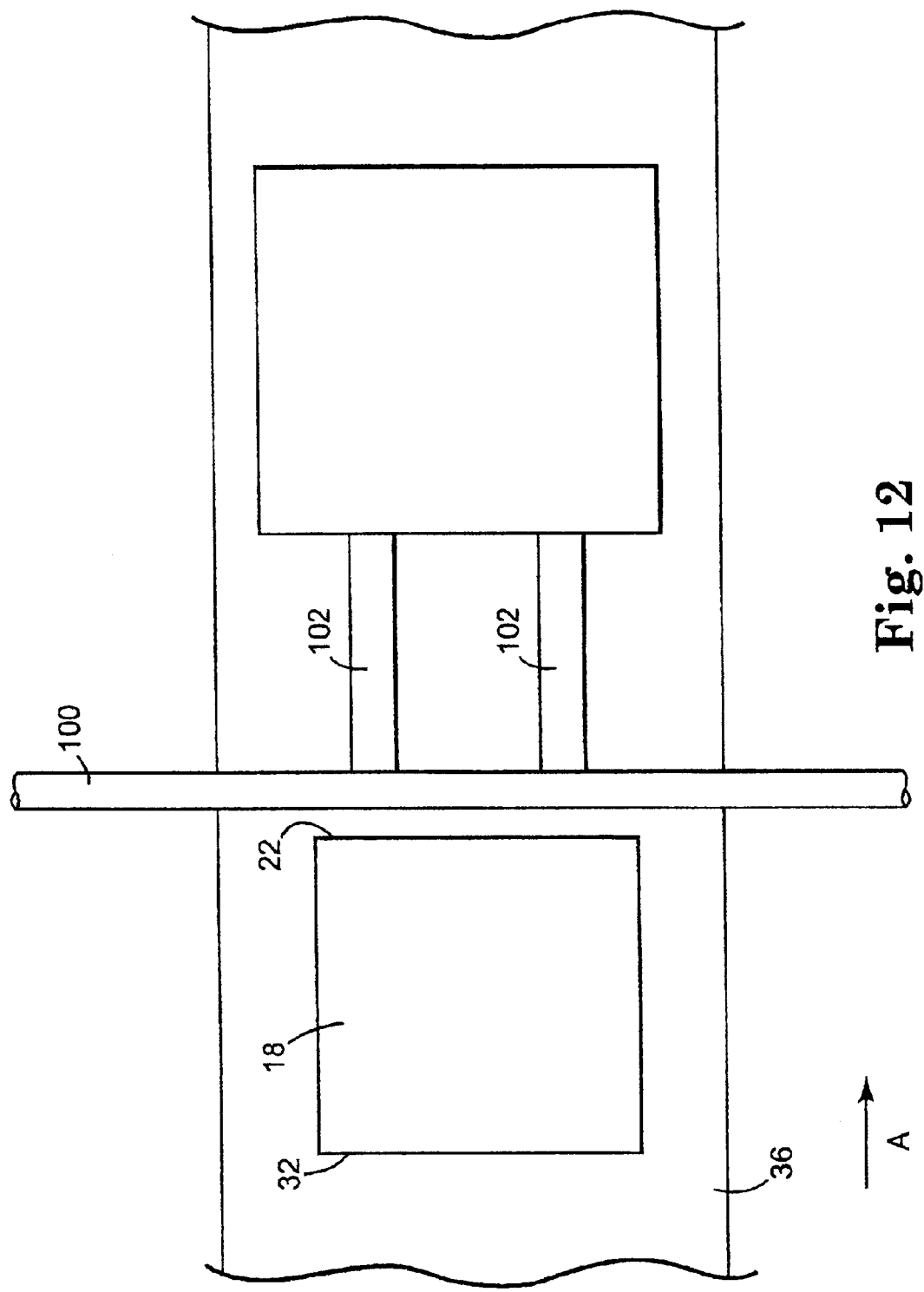
FIG. 12 is a partial top view of another dough rolling apparatus in accordance with the present invention showing sticker chains for initial impact with the leading feature of a dough sheet and a mesh sheet for further rolling.

An alternate embodiment of the present invention is illustrated in FIGS. 12 and 13. In FIG. 12 a top view is shown and in FIG. 13 a side view is shown. Referring to FIGS. 12 and 13, a support member 100 is shown that may be supported in position by any conventional structure. Preferably, at least one sticker chain 102 is connected to and extends from the support member 100 in the machine direction A for impacting and lifting the leading feature 22 in a similar manner as is described above. Sticker chains 102 may be attached to the support member 100 by any suitable means such as by a pivot, hinge or by fixed connection. More preferably, a pair of sticker chains 102 are attached to the support member 100 to extend in the machine direction A as is illustrated in the top view of FIG. 12. It is known that, any number of sticker chains 102 may be used such that the functional aspects of the present invention are accomplished. That is, a single sticker chain 102 may be used. It is preferably, in any case, that the one or more sticker chains 102 be located transversely so as to impact a leading feature 22 of a dough product 18 in a balanced or even way so that a good initial rolling occurs by such impact across the total leading edge of the sheet of dough product 18.

Referring to FIG. 14, an exemplary portion of a sticker chain 102 is illustrated. Such chain that is suitable for use as a sticker chain 102 in accordance with the present invention can be a chain such as is commercially available from U.S. Tsubaki, Inc. of Wheeling, Ill., such as, its sticker chain series including models RS60,RS80,RS100,RS120 and C2080H. Preferably, the sticker chain 102 includes multiple links 104 operatively connected together by pins 106, such as in the link and pin arrangement of a conventionally known chain. Preferably, the links 104 include spikes 108 that extend outward from the chain as is shown in FIG. 14. It is known that the spikes 108 may be any such outward projections, pins or rods that may be sharpened or not, and that the spikes 108 may extend from the chain in any direction such that the functional aspects of the present invention are realized. That is, it is contemplated that the spikes may be angled so as to better engage the leading feature 22 of a dough product. It is further understood that the spikes 108 are not required to be present on every link 104. That is, the spikes 108 may be on alternating links 104 or may be spaced apart such that the functional aspects of the present invention are accomplished. Also, it is contemplated that the sticker chain 102 may instead comprise any strip, belt, or the like of any width and length having spikes or outward extensions for grabbing and lifting the leading feature 22 of a sheet of dough product to initiate a rolling action in accordance with the present invention.

Further referring to FIG. 12, the sticker chains 102 are preferably connected to a drag chain 110 for providing resistance to tighten and complete the rolling of a sheet of dough product 18. Preferably, the drag chain 110 is a sheet of mesh type chain; however, as above, the drag chain 110 may be any device such as the stationary sheet 52 described above for creating a drag force against the movement of the dough product so as to tighten and complete the rolling action that has been started its impact with the sticker chains 102. That is, the drag chain 110 may be a sheet of canvas or other suitable material.

In operation, a sheet of dough product 18 moves in the process direction indicated by Arrow A as is shown in FIG. 13. Preferably, the leading feature 22 impacts at least a portion of one of the spikes 108 such that the leading feature 22 is lifted and folded over onto itself as described in detail above with respect to the operation of the impacting feature of the present invention. Continued movement in the machine direction A causes a tight dough product roll to be created in the same manner as described above.

The present invention is not limited to the above described preferred apparatus and method. More generally, the invention embraces forming a rolled dough product from a sheet of dough product. Furthermore, it should be understood that, while particular embodiments of the invention have been discussed, this invention is not limited thereto as modifications may be made by those skilled in the art, particularly in light of the foregoing teachings. Accordingly, the appended claims contemplate coverage of any such modifications as incorporate the essential features of these improvements within the true spirit and scope of the invention.

What is claimed is:

1. An apparatus for processing a dough product, the dough product having an engagement surface and a leading feature, the apparatus comprising:

a support structure;

a conveyor operatively supported by the support structure and having a movable surface upon which the engagement surface of the dough product can be carried in a process direction by a driving engagement between the moveable surface and the engagement surface of the dough product that is sufficient to transfer the dough product;

an impacting station comprising an impacting device operatively supported relative to the conveyor and movably disposed relative to the movable surface of the conveyor, the impacting device movable between an impact position wherein at least a portion of the impacting device is positioned to impact the leading feature of the dough product as it is conveyed to the impacting station and a position wherein the dough product can pass between it and the conveyor, and an engagement enhancement means for temporarily increasing and thus enhancing the driving engagement between the moveable surface of the conveyor and the engagement surface of the dough product when the impacting device will impact the leading feature of the dough product, wherein the means for enhancing driving engagement between the moveable surface and the dough product surface is a force of differential pressure obtained by creating a region of lower pressure than the ambient environment at a position below the movable surface, the region of low pressure extending at least across a portion of a width of the movable surface and extending a predetermined distance in the process direction.

2. The apparatus of claim 1, wherein the impacting device is pivotably connected to a support member of the support structure and is further connected to a latching mechanism capable of holding the impacting device in a raised position.

3. The apparatus of claim 2, wherein the latching mechanism is connected to a trigger mechanism operatively supported in a position downstream in the process direction for releasing the latching mechanism and thereby allowing the impacting device to move to an unlatched position.

4. The apparatus of claim 3, wherein the trigger mechanism further includes a trigger device operatively mounted to the support structure and positioned so as to be hit by a rolled dough product for causing the trigger mechanism to release the latching mechanism and thereby allowing the impacting device to move to an unlatched position.

5. The apparatus of claim 1, wherein the impacting device is pivotably connected to a support member of the support structure and further includes an extendable cylinder connected to a support member of the support structure, the extendable cylinder for controlled pivoting the of impacting device.

6. The apparatus of claim 1, wherein the impacting device comprises a board pivotably connected to a support member of the support structure, the board having a plurality of grooves defining teeth for impacting the leading feature of the sheet of dough product.

7. The apparatus of claim 1, wherein the impacting device comprises a chain with at least one link having a projection that extends outward from the chain for impacting the leading feature of the sheet of dough product.

8. The apparatus of claim 1, further comprising a vacuum chamber for creating the region of low pressure and wherein the moveable surface is perforated to permit enhancement of the driving engagement between the moveable surface and the engagement surface of the sheet of dough product.

9. The apparatus of claim 1, further comprising a rolling device operatively supported by the support structure and having a rolling member disposed downstream in the process direction from the impacting station and relative to the movable surface of the conveyor for creating a drag force on a roll initiated portion of the dough product as it is driven by the movable surface for further rolling the dough product.

10. The apparatus of claim 9, wherein the rolling member comprises a chain mesh.

11. The apparatus of claim 9, wherein the rolling member comprises a sheet material.

12. The apparatus of claim 1, wherein the apparatus comprises a plurality of processing lanes wherein each lane includes an impacting station comprising an impacting device operatively supported relative to the conveyor and an engagement enhancement means for enhancing a driving engagement between the moveable surface of the conveyor and the engagement surface of the dough product when the impacting device will impact the leading feature of the dough product.

13. The apparatus of claim 12, wherein for each lane, the means for enhancing driving engagement between the moveable surface and the dough product surface is a force of differential pressure obtained by creating a region of low pressure positioned below the movable surface, the region of low pressure extending across a width of the movable surface of plural processing lanes and extending a predetermined distance in the process direction.

14. The apparatus of claim 13, further comprising a vacuum chamber for creating the region of low pressure and wherein the moveable surface is perforated to enhance driving engagement between the moveable surface and the engagement surface of the sheet of dough product.

15. An apparatus for processing a dough product, the dough product having an engagement surface and a leading-feature, the apparatus comprising:

a support structure;

a conveyor operatively supported by the support structure and having a movable surface upon which the engagement surface of the dough product can be carried in a process direction by a driving engagement between the moveable surface and the engagement surface of the dough product;

an impacting station comprising a chain having a plurality of links, at least one of the links having a projection extending outward therefrom, the chain being operatively supported by the support structure and movably disposed relative to the movable surface of the conveyor so as to be movable between an impact position wherein at least a link of the chain with a projection is positioned to impact the leading feature of the dough product as it is conveyed to the chain and a position wherein the dough product can pass between it and the conveyor.

16. The apparatus of claim 15, further comprising an engagement enhancement means for enhancing a driving engagement between the moveable surface of the conveyor and the engagement surface of the dough product when the impacting device will impact the leading feature of the dough product.

17. An apparatus for processing a dough product, the dough product having an engagement surface and a leading feature, the apparatus comprising:

a support structure;

a conveyor operatively supported by the support structure and having a movable surface upon which the engagement surface of the dough product can be carried in a process direction by a driving engagement between the moveable surface and the engagement surface of the dough product; and an impacting station comprising an impacting device operatively supported relative to the conveyor and movably disposed relative to the movable surface of the conveyor, the impacting device movable between an impact position wherein at least a portion of the impacting device is positioned to impact the leading feature of the dough product as it is conveyed to the impacting station and a position wherein the dough product can pass between it and the conveyor; wherein the impacting device is further connected to a latching mechanism capable of holding the impacting device in a raised position and the latching mechanism is connected to a trigger mechanism operatively supported in a position downstream in the process direction for releasing the latching mechanism and thereby allowing the impacting device to move to an unlatched position.

18. The apparatus of claim 17, wherein the trigger mechanism further includes a trigger device operatively mounted to the support structure and positioned so as to be hit by a rolled dough product for causing the trigger mechanism to release the latching mechanism and thereby allowing the impacting device to move to an unlatched position.

19. The apparatus of claim 17, wherein the impacting device is pivotably connected to a support member of the support structure and further includes an extendable cylinder connected to a support member of the support structure, the extendable cylinder for controlled pivoting the of impacting device.

20. The apparatus of claim 17, wherein the impacting device comprises a board pivotably connected to a support member of the support structure, the board having a plurality of grooves defining teeth for impacting the leading feature of the sheet of dough product.

21. The apparatus of claim 17, wherein the impacting device comprises a chain with at least one link having a projection that extends outward from the chain for impacting the leading feature of the sheet of dough product.

22. The apparatus of claim 17, further including an engagement enhancement means for enhancing the driving engagement between the moveable surface of the conveyor and the engagement surface of the dough product when the impacting device will impact the leading feature of the dough product, wherein the means for enhancing driving engagement between the moveable surface and the dough product surface is a force of differential pressure obtained by creating a region of low pressure positioned below the movable surface, the region of low pressure extending at least across a portion of a width of the movable surface and extending a predetermined distance in the process direction.

23. The apparatus of claim 22, further comprising a vacuum chamber for creating the region of low pressure and wherein the moveable surface is perforated to permit enhancement of the driving engagement between the moveable surface and the engagement surface of the sheet of dough product.

24. The apparatus of claim 17, further including an engagement enhancement means for enhancing the driving engagement between the moveable surface of the conveyor and the engagement surface of the dough product when the impacting device will impact the leading feature of the dough product, wherein the means for enhancing driving engagement between the moveable surface and the dough product surface is a force of differential pressure obtained by creating a region of high pressure positioned above the movable surface, the region of high pressure extending at least across a portion of a width of the movable surface and extending a predetermined distance in the process direction.

25. The apparatus of claim 17, further comprising a rolling member operatively supported and disposed downstream from the impacting station, wherein the rolling member comprises a chain mesh.

26. The apparatus of claim 17, further comprising a rolling member operatively supported and disposed downstream from the impacting station, wherein the rolling member comprises a sheet material.

27. The apparatus of claim 17, wherein the apparatus comprises a plurality of processing lanes wherein each lane includes an impacting station comprising an impacting device operatively supported relative to the conveyor and an engagement enhancement means for enhancing a driving engagement between the moveable surface of the conveyor and the engagement surface of the dough product when the impacting device will impact the leading feature of the dough product, and the means for enhancing driving engagement between the moveable surface and the dough product surface is a force of differential pressure obtained by creating a region of low pressure positioned below the movable surface, the region of low pressure extending across a width of the movable surface of plural processing lanes and extending a predetermined distance in the process direction, and further comprising a vacuum chamber for creating the region of low pressure and wherein the moveable surface is perforated to enhance driving engagement between the moveable surface and the engagement surface of the sheet of dough product.

28. A method for processing a dough product comprising the steps of:
    providing a dough product, the dough product having an engagement surface and a leading feature;
    positioning the engagement surface of the dough product onto a movable surface of a conveyor;
    transferring the dough product in a process direction by a driving engagement between the dough product engagement surface and the movable surface of the conveyor;
    impacting the leading feature of the dough product with an impact device operatively positioned along the process direction by movement of the movable surface of the conveyor; and
    wherein the step of impacting the leading feature with the impact device, further comprising temporarily increasing and thus enhancing the driving engagement between the engagement surface of the dough product and the movable surface by creating a region of low pressure as compared to the ambient environment at a position below the movable surface, the region of low pressure extending at least across a portion of a width of the movable surface and extending a predetermined distance in the process direction.

29. The method of claim 28, wherein the impacting step further comprises moving the impacting device to a position permitting the dough product to move between the impacting device on the conveyor, and latching the impact device in a raised position by a latching mechanism.

30. The method of claim 29, further comprising the step of triggering release of the latching mechanism from the raised position of the impacting device by way of a trigger mechanism that is operatively supported in a position downstream in the process direction and thereby allowing the impacting device to move to an unlatched position.

31. The method of claim 30, wherein the step of triggering release of the latching mechanism comprises conveying the dough product downstream of the impacting device in the process direction and hitting a trigger device of the trigger mechanism.

32. The method of claim 28, wherein the impacting device is pivotably connected to a support member of a support structure and further includes an extendable cylinder for controlled pivoting of the impacting device.

33. The method of claim 28, wherein the impacting step comprises providing a board pivotably connected to a support member of a support structure, the board having a plurality of grooves defining teeth for impacting the leading feature of the sheet of dough product.

34. The method of claim 28, wherein the impacting step comprises providing a chain with at least one link having a projection that extends outward from the chain for impacting the leading feature of the sheet of dough product.

35. The method of claim 28, wherein a vacuum chamber is provided for creating the region of low pressure and wherein the moveable surface is perforated to permit enhancement of the driving engagement between the moveable surface and the engagement surface of the sheet of dough product.

36. The method of claim 28, further comprising a step of rolling the dough product by a rolling device operatively provided downstream in the process direction from the impacting device that creates a drag force on a roll initiated portion of the dough product as it is driven by the movable surface.

37. The method of claim 28, further comprising processing of a plurality of dough products at the same time by an apparatus comprising a plurality of processing lanes wherein each lane includes an impacting station comprising an impacting device and an engagement enhancement means for enhancing a driving engagement between the moveable surface of the conveyor and the engagement surface of the dough product when the impacting device impacts the dough product.

38. A method for processing a dough product comprising the steps of:
    providing a dough product, the dough product having an engagement surface and a leading feature;
    positioning the engagement surface of the dough product onto a movable surface of a conveyor;
    transferring the dough product in a process direction by a driving engagement between the engagement of the dough product and the movable surface of the conveyor; and
    impacting the leading feature of the dough product with an impact device operatively positioned along the process direction by movement of the movable surface of the conveyor, and thereby initiating a partial roll of the sheet of dough product; wherein the impacting step further comprises moving the impacting device to a position permitting the dough product to move between the impacting device on the conveyor, and latching the impact device in a raised position by a latching mechanism followed by the step of triggering release of the latching mechanism comprises conveying the dough product downstream of the impacting device in the process direction and hitting a trigger device of the trigger mechanism.

39. The method of claim 38, wherein the step of triggering release of the latching mechanism comprises conveying the dough product downstream of the impacting device in the process direction and hitting a trigger device of the trigger mechanism.

40. The method of claim 38, wherein the impacting device is pivotably connected to a support member of a support structure and further includes an extendable cylinder for controlled pivoting of the impacting device.

41. The method of claim 38, wherein the impacting step comprises providing a board pivotably connected to a support member of a support structure, the board having a plurality of grooves defining teeth for impacting the leading feature of the sheet of dough product.

42. The method of claim 38, wherein the impacting step comprises providing a chain with at least one link having a projection that extends outward from the chain for impacting the leading feature of the sheet of dough product.

43. The method of claim 38, further comprising a step of enhancing the driving engagement of the dough product and the moveable surface when impacting the leading feature with the impact device, wherein the step of enhancing the driving engagement comprises creating a force of differential pressure obtained by creating a region of low pressure positioned below the movable surface, the region of low pressure extending at least across a portion of a width of the movable surface and extending a predetermined distance in the process direction.

44. The method of claim 43, further comprising a step of enhancing the driving engagement of the dough product and the moveable surface when impacting the leading feature with the impact device, wherein a vacuum chamber is provided for creating the region of low pressure and wherein the moveable surface is perforated to permit enhancement of the driving engagement between the moveable surface and the engagement surface of the sheet of dough product.

45. The method of claim 38, wherein the step of enhancing the driving engagement comprises creating a force of differential pressure obtained by creating a region of high pressure positioned above the movable surface, the region of high pressure extending at least across a portion of a width of the movable surface and extending a predetermined distance in the process direction.

46. The method of claim 38, further comprising processing of a plurality of dough products at the same time by an apparatus comprising a plurality of processing lanes wherein each lane includes an impacting station comprising an impacting device and an engagement enhancement means for enhancing a driving engagement between the moveable surface of the conveyor and the engagement surface of the dough product when the impacting device impacts the dough product.

* * * * *